FIG. 1.

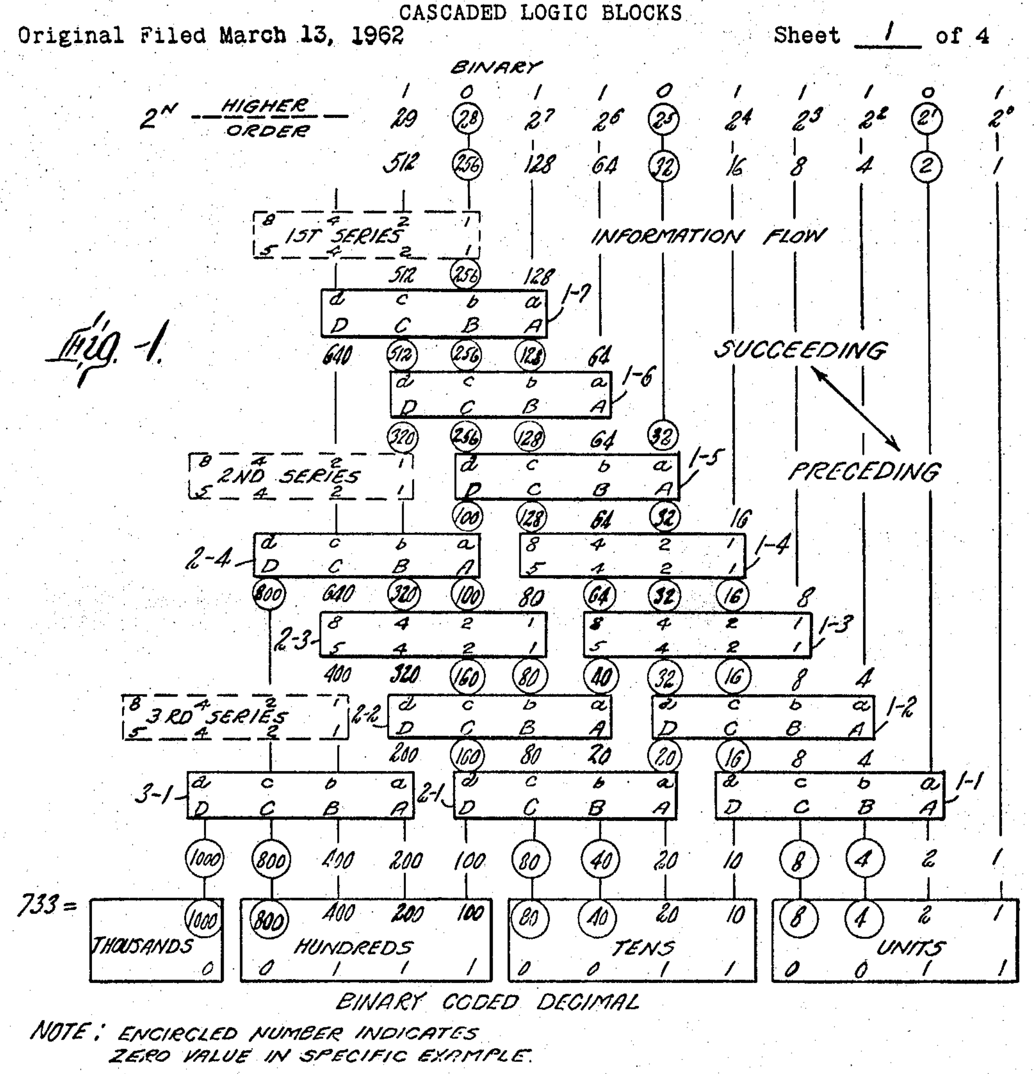

| DECIMAL | CODE 5 4 2 1 | CODE 8 4 2 1 | BINARY TO BINARY CODED DECIMAL CONVERTER UNIT BOOLEAN EXPRESSIONS | BINARY CODED DECIMAL TO BINARY CONVERTER UNIT BOOLEAN EXPRESSIONS |
|---|---|---|---|---|
| 0 | 0 0 0 0 | 0 0 0 0 | | |
| 1 | 0 0 0 1 | 0 0 0 1 | | |
| 2 | 0 0 1 0 | 0 0 1 0 | | |
| 3 | 0 0 1 1 | 0 0 1 1 | | |
| 4 | 0 1 0 0 | 0 1 0 0 | | |
| 5 | 1 0 0 0 | 0 1 0 1 | $A=\bar{d}\bar{c}a+cb\bar{a}+d\bar{a}$ | $a=A\bar{D}+\bar{A}D$ |
| 6 | 1 0 0 1 | 0 1 1 0 | | |
| 7 | 1 0 1 0 | 0 1 1 1 | | |
| 8 | 1 0 1 1 | 1 0 0 0 | $B=\bar{c}b+ba+d\bar{a}$ | $b=B\bar{D}+A\bar{B}D+\bar{A}B$ |
| 9 | 1 1 0 0 | 1 0 0 1 | | |
| 10 | REPEATS | 1 0 1 0 | $C=cb\bar{a}+da$ | $c=C\bar{D}+\bar{B}\bar{C}D+\bar{A}\bar{C}D$ |
| 11 | | 1 0 1 1 | | |
| 12 | | 1 1 0 0 | $D=cb+ca+d$ | $d=ABD+CD$ |
| 13 | | 1 1 0 1 | | |
| 14 | | 1 1 1 0 | | |
| 15 | | 1 1 1 1 | | |
| 16 | | REPEATS | | |

$a = A\bar{D} + \bar{A}D$ $b = B\bar{D} + A\bar{B}D + \bar{A}B$ $c = C\bar{D} + \bar{B}CD + \bar{A}\bar{C}D$ $d = ABD + CD$

United States Patent Office 3,449,555

Patented June 10, 1969

3,449,555

PARALLEL BINARY TO BINARY CODED DECIMAL AND BINARY CODED DECIMAL TO BINARY CONVERTER UTILIZING CASCADED LOGIC BLOCKS

An Wang, Lincoln, Mass., assignor to Wang Laboratories Inc., Tewksbury, Mass., a corporation of Massachusetts Continuation of application Ser. No. 179,322, Mar. 13, 1962. This application June 2, 1965, Ser. No. 460,649
Int. Cl. G06f *5/02;* H04l *3/00;* H03k *13/00*
U.S. Cl. 235—155 7 Claims

ABSTRACT OF THE DISCLOSURE

Parallel conversion of signals representing multi-bit binary numbers to signals representing binary-coded numbers (e.g. binary-coded-decimal numbers) and of signals representing binary-coded numbers to binary numbers. A single modular logic net suffices for each conversion. Specified direct interconnections of such modular nets in a plurality of stepped series provides all circuitry necessary to perform virtually instantaneous conversion even of numbers of relatively high order.

This invention is a continuation of my application Ser. No. 179,322, filed Mar. 13, 1962, now abandoned, and relates to computer logic and more particularly to novel converters, for converting in either direction, for example, binary fractions to binary coded fractions as well as multi-order integral numbers.

Binary converters including binary to binary coded decimal converters have long been known and used in the computer art, but known converters have tended to become highly complicated and utilized in an inordinate number of components when conversion of multi-order numbers having of the order of upwards of ten bits had to be accomplished, either of fractions or integral numbers. Furthermore, many known converter systems operated by successive counting or pulses, which systems required relatively long operating times, especially when high order numbers were to be converted.

Accordingly, it is a major object of the present invention to provide multi-order converter systems having relatively few components yet capable of converting numbers having any desired number of bits.

It is another object to provide high speed conversion, without the necessity of carrying out successive counting operations in order to effect the conversion, so that conversion is essentially instantaneous, regardless of the magnitude of the orders of the number to be converted.

It is a particular feature of the invention that converter sub-units are also provided, by means of which sub-units a system according to the invention may readily be assembled by interconnection of appropriate input and output terminals of identical sub-units in a plurality of stepped series of converter sub-units directly connected to one another to provide whatever order of conversion desired.

In brief, these objects and features of the invention are accomplished for the case of binary to binary coded decimal converter by the connection between a plurality of binary terminals of successively ascending order, and a plurality of "1248" coded groups of binary coded decimal terminals in successively ascending order, a plurality of "1248–1245" coded converter means. Preferably, each converter means has "1," "2," "4," "8," "1248" coded terminals and "1," "2," "4," "5," "1245" coded terminals interconnected by "1248–1245" coding circuit means, in accordance with the following table:

| Decimal | "5421" | 8421 |
|---|---|---|
| 0 | 0000 | 0000 |
| 1 | 0001 | 0001 |
| 2 | 0010 | 0010 |
| 3 | 0011 | 0011 |
| 4 | 0100 | 0100 |
| 5 | 1000 | 0101 |
| 6 | 1001 | 0110 |
| 7 | 1010 | 0111 |
| 8 | 1011 | 1000 |
| 9 | 1100 | 1001 |
| 10 | repeats | 1010 |
| 11 | | 1011 |
| 12 | | 1100 |
| 13 | | 1101 |
| 14 | | 1110 |
| 15 | | 1111 |
| 16 | | Repeats |

Note that the "1245" code for the decimal numbers 0–4 differs from that for 5–9 only by the change from 0 to 1 in the "5" coded column.

This makes possible the use of converter units having four input and four output terminals related in accordance with the table and with the following Boolean expressions:

For binary to binary coded decimal conversion, $$A=\bar{d}\bar{c}a+cb\bar{a}+d\bar{a}$$
$$B=\bar{c}b+ba+d\bar{a}$$
$$C=c\bar{b}\bar{a}+da$$
$$D=cb+ca+d$$

For binary coded decimal to binary conversion, $$a=A\bar{D}+\bar{A}D$$
$$b=B\bar{D}+A\bar{B}D+\bar{A}B$$
$$c=C\bar{D}+\bar{B}\bar{C}D+\bar{A}\bar{C}D$$
$$d=ABD+CD$$

where $a$, $b$, $c$, $d$ or their opposites $\bar{a}$, $\bar{b}$, $\bar{c}$, $\bar{d}$ are the four "1248" input or output terminals in increasing order of magnitude and A, B, C, D or their opposites $\bar{A}$, $\bar{B}$, $\bar{C}$, $\bar{D}$ are the four "1245" input or output terminals in increasing order of magnitude.

Such converter units are arranged in a plurality of series of converter units directly interconnected with converters of a preceding and succeeding series such as to provide a plurality of stepped series, which series may consist of one or more converter units, usually at least four in number, with the "2," "4," "8," "1248" coded terminals of a preceding converter means of each of said series connected respectively to the "1," "2," "4," "1245" coded terminals of a succeeding converter means of that same series. The "1," "1248" terminals of successively succeeding converter means of the first of said series are connected to binary terminals of successively increasing order. The "5" "1245" coded terminals of successively succeeding converter means of the first of said series are connected to the "1" "1248" coded terminals of the preceding converter means of the next of said series, so that conversions of any order may be accomplished.

The "1," "2," "4," "1245" coded terminals of the first preceding converter means of each said series in ascending succession is connected respectively to the "2," "4," "8," "1248" binary coded decimal terminals of groups of ascending order, with the "1" "1248" coded binary coded decimal terminal of the lowest order group being connected to the lowest order binary terminal, and with the "5" "1245" coded terminals of the first converter means of each of said series being connected to the "1" "1248" coded binary coded decimal terminals of successively higher order groups thereof. It will be obvious to those skilled in the art that the invention is not limited to binary coded decimal conversion systems and may be extended to numbers other than those of the base 10.

For the purpose of fully explaining further objects and features of preferred embodiments of the invention, reference is now made to the following detailed descriptions thereof, together with the accompanying drawings, wherein:

FIG. 1 is a block diagram of an integral number converter system according to the invention, together with a "1245" code table and tables of converter unit Boolean expressions;

Figure 2:
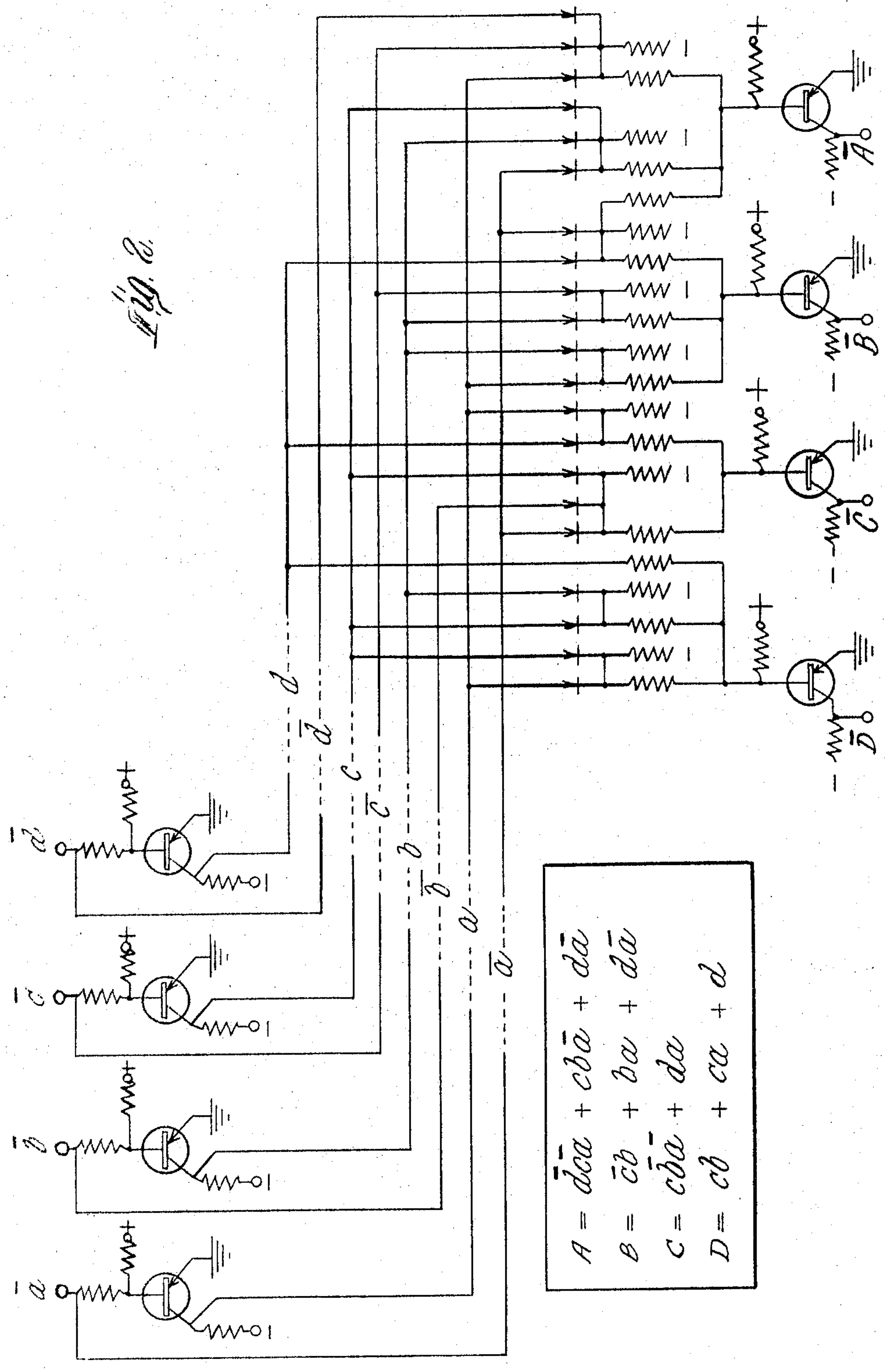
FIG. 2 is a circuit diagram of a binary in binary coded decimal converter unit including appropriate inputs and outputs.

Referring to FIG. 1, for binary to binary coded decimal conversion, a binary number input of successively increasing order is provided for at terminals $2^0$, $2^1$, $2^2$, . . . $2^N$, heerin shown as including terminal $2^9$, in the form of a voltage level input, either of a voltage or no voltage to represent "1" or "0" in the binary number system as required. The "1248" binary coded decimal output of the system appears at groups having four "1248" coded terminals in each group, with the groups themselves being designated as UNITS, TENS, HUNDREDS, with but the single lowest order terminal of the THOUSANDS group in the specific example shown. An added and a display device might be connected to each of such output terminal groups in order to display the converted number in decimal The binary to binary coded decimal converter units, shown in FIG. 2, are all identical and included four input "1," "2," "4," "8," "1248" coded terminals of sequentially increasing binary order *a, b, c, d* and four corresponding output "1," "2," "4," "5," "1245" coded terminals of increasing order either A, B, C, D, the input and output terminals being connected in accordance with a "1248–1245" code as set forth above. Equivalent codes may be used. Such converters are arranged in a plurality of series of converter units directly interconnected with converters of a preceding and succeeding series to provide a plurality of stepped series as shown in FIG. 1 with the converters of the first series being designated as 1–1, 1–2, 1–3, 1–4, 1–5, 1–6, 1–7, the second series 2–1, 2–2, 2–3, 2–4, and the third series 3–1. The next succeeding converter for each of the three series is shown in dotted lines, and is necessary if a higher order binary number than $2^9$ is to be converted. In each series, the first and lowest order converter, 1–1, 2–1, 3–1 is that connected to the output terminals, UNITS, TENS, HUNDREDS, THOUSANDS, with the other converters succeeding it in sequence until the last, highest order converter, 1–7, 2–4, is reached.

The first series of converters in number are equal to $N-2$ and, in general, have their lowest order input terminals, *a*, (their "1" "1248" coded terminals) directly connected to input terminals $2^1$, $2^2$, $2^3$, $2^4$, $2^5$, $2^6$, $2^7$ $2^8$, with the next succeeding higher order input terminals *b*, *c* of the last converter 1–7 connected to terminals $2^8$, $2^9$, respectively. The highest order input *d* of last converter 1–7 must not be used. The lowest order binary input at terminal $2^0$ need not be converted and is passed directly to the lowest order "1" "1248" terminal of UNITS group.

The converters of the series are interconnected in a stepped series with the three highest order input terminals, *d, c, b* ("8," "4," "2," or "1248" coded terminals) of a preceding converter, say converter, 1–6, connected, respectively, to the three lowest order output terminals C, B, A—"4," "2," "1," "1245" coded terminals of a succeding converter, 1–7, all of the converters within a series being so connected. The first converter, 1–1, of the first series at its three lowest order terminals, C, B, A, ("4," "2," "1," "1245" coded terminals) together with the binary input at terminal $2^0$, provides the converted UNITS output at its terminals "8," "4," "2," "1" respectively, with the output at its highest order terminal D, (its "5" "1245" coded terminal) providing the lowest order converted TENS output at the "1" "1248" coded terminal thereof.

In the second series of converters, the input to the last converter, 2–4, is provided by the highest order outputs of first series converters 1–7, 1–6, 1–5 of the first series, their terminals D (their "5" terminal) respectively being connected to terminals *c, b, a* of converter 2–4. The converters 2–4, 2–3, 2–2, 2–1 are connected as with the first series, with the lowest order input terminals a (their "1" "1248" coded terminal), of converters 2–1, 2–2, 2–3, being connected respectively to the highest order output terminals D (the "5" terminals) of first series converters, 1–2, 1–3, 1–4. The first converter 2–1 of the second series provides at its output terminals, A, B, C (that is, "1," "2," "4" of its "1245" coded terminals) the three highest order TENS conversion together with the highest order output terminal, D (the "5" terminal), of the first series converter, 1–1. Output terminal, D (the "5" terminal) of first second series converter, 2–1, provides the lowest order HUNDREDS conversion.

The third series, with a ten bit binary input as shown, consists of but a single converter, 3–1, which receives inputs to its "1245" terminals, *c, b, a*, that is, "4," "2," "1" respectively from the highest order output terminal D, that is "5" of second series converters, 2–4, 2–3, 2–2, 2–1. The three lowest order output "1245" coded terminals, C, B, A, that is "4," "2," "1" of converter 3–1 providing with highest order output terminal D ("5"), of the first second series converter, 2–1, the group of four HUNDREDS output. The highest order output terminal, D ("5"), of third series converter, 3–1, provides the lowest order—and with a ten bit input the only—THOUSANDS output.

For converters, according to the invention, requiring higher bit inputs for the conversion of higher order binary numbers, each of the three series may be extended in the direction shown by the dotted rectangles in FIG. 1, keeping in mind that the highest order input "1248" coded terminal, *d* (that is, "8" of the last or highest order converter of a series) must not be used as an input.

A specific circuit of a four input terminal, four output terminal binary to "1248–1245" coded decimal converter suitable for use in the system of FIG. 1 is shown in FIG. 2, such converter being such as to satisfy both the table and the Boolean expressions set forth above. It will be noted that its input terminals $\bar{a}$, $\bar{b}$, $\bar{c}$, $\bar{d}$ are equivalent to a "1248" code respectively and that suitable transistor inverters are provided so that signals of *a, b, c, d* are as well available as required. Output terminals of, $\bar{A}$, $\bar{B}$, $\bar{C}$, $\bar{D}$ are provided for the "1245" coded terminals again through a suitable transistor inverter. The circuitry of the converter unit shown is generally conventional, employing diode-resistor networks having positive and negative voltages applied thereto, a negative voltage input representing "1" and a zero voltage input representing "0." Note particularly, however, that voltage actuated circuits of this type, as contrasted with pulse actuated circuits, permit simultaneous operation of all the converter units in a system, so that the conversion is not limited by the necessity of carrying out successive counting operations. Circuits of this type are so well known in the art as to make any detailed explanation of its operation, above the explanations otherwise given herein, unnecessary.

The operation of the system of the invention can be best understood by reference to FIG. 1, including the code table therewith, wherein it will be seen that such code is never greater than nine, and that the code for 0–4 and 5–9 differ only in the presence of a "1" in the "5" column in the latter case rather than a "0" in the former case. The input and output quantities to the converters appear on the connecting lines to their terminals to enable the transformations more readily to be observed, transformations wherein, in effect, the "5" coded quantity is continuously and sequentially extended in the direction of higher order binary numbers, leaving groups of four terminals, UNITS, TENS, etc. wherein the sum is never greater than nine. The transformations thus proceed in coded groups of 1, 2, 4, 8, 10, 20, 40, 80, etc. with higher order numbers being converted as is necessary to conform them to such a group, such groups providing the binary coded decimal output desired.

A specific example of a binary to binary coded decimal conversion system is included in FIG. 1, wherein the binary number 1011011101 (of increasing order from right to left) is converted to its binary coded decimal equivalent of 733. Throughout the system, the presence of a "1" at the input and output terminals of a converter unit is indicated by the presence of the equivalent number without a circle around it, whereas the presence of a "0" is indicated by a circle about that number. Thus, considering the first converter unit 1–7 of the first series, its inputs *a*, *b*, *c*, *d* are 1, 0, 1, 0 respectively, which, from the code table above and in FIG. 1, produce outputs A, B, C, D or 0, 0, 0, 1 (decimal 5). The input provided to the next converter unit 1–6 is thus 1 (directly from the binary input) and 0, 0, 0 from converter unit 1–7. Referring again to the table, the output produced is 1, 0, 0, 0 (decimal 1). This process is continued throughout the converter units, giving the inputs and outputs as indicated in FIG. 1, and finally producing the binary coded decimal output 1100, 1100, 1110, 0000 (of increasing order) equal to 733.

Figure 3:
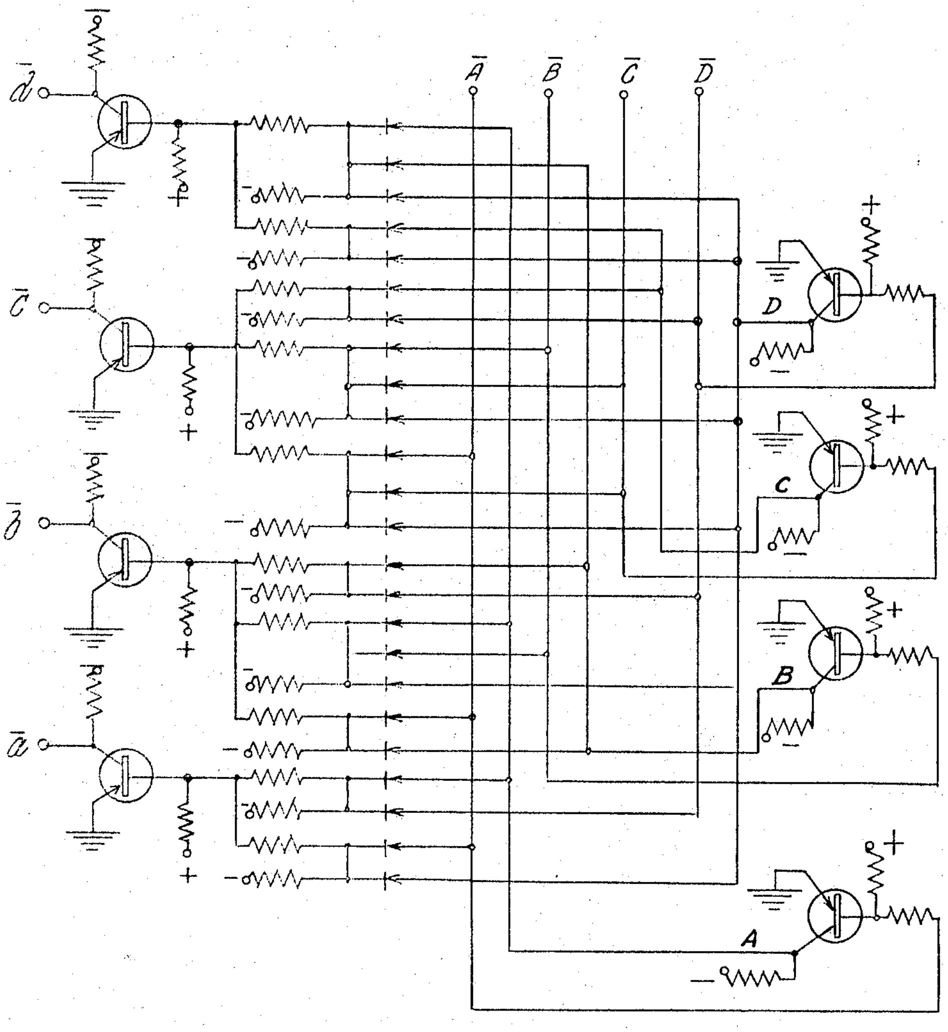
FIG. 3 is a circuit diagram of a binary coded decimal to binary converter unit including appropriate inputs and outputs.

For conversion of a binary coded decimal to a binary multi-order number, the arrangement of FIG. 1 is again used, but the converter units of FIG. 3 are substituted. In the latter converter units, to conform with the showing of FIG. 1, the "1245" input terminals are indicated as $\overline{A}$, $\overline{B}$, $\overline{C}$, $\overline{D}$ and the "1248" output terminals as $\overline{a}$, $\overline{b}$, $\overline{c}$, $\overline{d}$. The converter unit of FIG. 3 satisfies the table for conversion in the opposite direction from that of FIG. 2, as well as satisfying the Boolean expression set forth in conjunction therewith.

Figure 4:
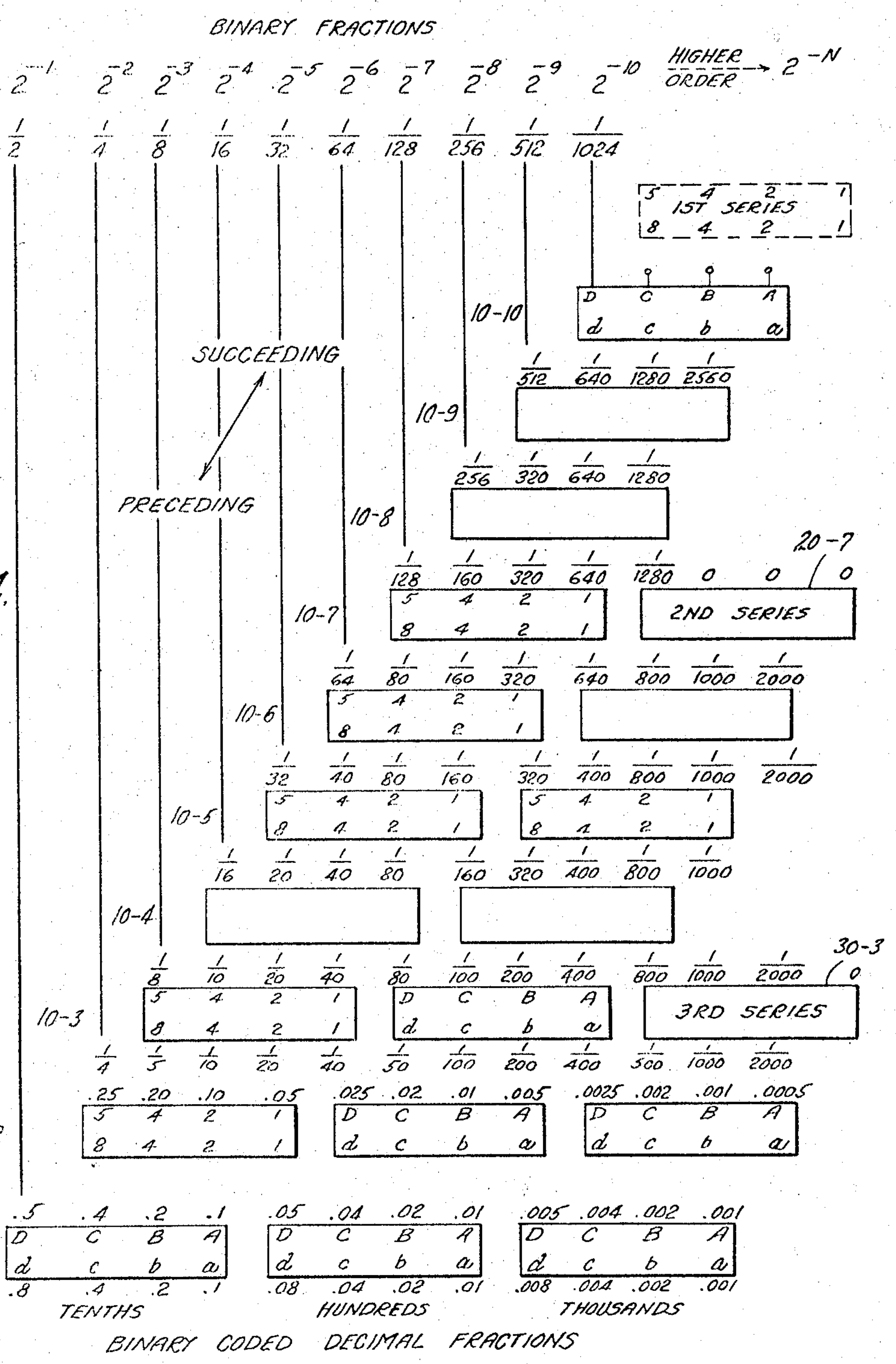
FIG. 4 is a block diagram of a fraction converter system according to the invention.

The system for the conversion of fractions, shown in FIG. 4, is generally similar to the conversions described above in conjunction with FIG. 1. It utilizes the converter units of FIGS. 2 or 3 depending upon the direction of conversion, with such converters being identical in a given conversion system and being designated as to their terminals in the same manner as in FIGS. 1–3. Three series of converter units are used, first series 10, second series 20, and third series 30, and the fractional or decimal quantities are indicated between the converter units on FIG. 4. Note particularly the equivalency of the fractions and decimals between the lines 2 and 3 of the series of converter units as noted on converter units 10–2 and 10–3, wherein there occurs an exact transformation between a fraction and a decimal at each output and input, with these occurring in the required "1245" or "1248" order. Note, too, that there is but an approximation in equality of input and output, although a highly useful one of the order of plus or minus one digit in the highest fractional order (i.e. 1/1024 or 0.001 in the example of FIG. 3). To this end, all small fractions, say of less than half that value, say 1/2000 or 0.005, and the converter units through which they would pass, may be omitted, as was done in FIG. 4. As this fractional converter system operates in much the same manner as that described above in connection with FIG. 1, in either direction depending upon the converter units used, it need not be further explained herein.

Thus it will be seen that the invention provides novel computer logic converters including binary to binary coded decimal as well as other converter systems both for integers and fractions having substantial advantages, primarily as to simplicity and hence reliability, over heretofore known such converter systems. Various modifications of the invention, within the spirit thereof and the scope of the appended claims, will be apparent to those skilled in the computer logic art.

I claim:

1. Apparatus for translating coded data between binary form and a coded binary form comprising a plurality of logic blocks each having first and second sets of binary weighted terminals, the number of terminals in said first set being equal to the number of terminals in said second set, and logic circuitry interconnecting said first and second sets of terminals for translating an input signal from a code conforming to the weights accorded the first set of terminals to a code conforming to the weight accorded to the second set of terminals, wherein the weight accorded to the most significant terminal of said second set is different from the weight accorded to the corresponding terminal of said first set, and circuit means for connecting said logic blocks between a first register for storing data signals in binary form and a second register for storing signals in binary coded form for transferring signals between said first and second registers to effect a binary code conversion, said circuit means including a plurality of direct connections between said logic blocks.

2. In a binary to binary coded decimal converter system, a plurality of binary terminals, a plurality of binary coded decimal terminals, a plurality of "1248–1245" coded converter means each having two groups of terminals including "1," "2," "4," "8," "1248" coded terminals and "1," "2," "4," "5," "1245" coded terminals interconnected by "1248–1245" coding circuit means, said converter means being connected in a plurality of stepped series with the "2," "4," "8," "1248" coded terminals of a preceding converter means of each of said series directly connected respectively to the "1," "2," "4," "1245" coded terminals of a succeeding converter means of that same series, with the remaining terminals of one group of successively succeeding converter means of the first of said series connected to binary terminals of successively increaing order, and with the remaining terminals of the other group of successively succeeding converter means of the first of said series directly connected to terminals of the preceding converter means of the next of said series, the terminals of the first preceding converter means of each said series in increasing order being connected to said binary coded decimal terminals.

3. In a binary to binary coded decimal converter system, a plurality of binary terminals of successively increasing order, a plurality of "1248" coded groups of binary coded decimal terminals in successively increasing order, a plurality of "1248–1245" coded converter means each having "1," "2," "4," "8," "1248" coded terminals and "1," "2," "4," "5," "1245" coded terminals interconnected by "1248–1245" coding circuit means, said converter means being connected in a plurality of stepped series with the "2," "4," "8," "1248" coded terminals of the converter means of each of said series directly connected respectively to the "1," "2," "4," "1245" coded terminals of an adjacent converter means of that same series, with one of the "1" "1248" and the "5" "1245" coded terminals of successively succeeding converter means of the first of said series connected to binary terminals of successively increasing order, and with the other of the "1" "1248" and "5" "1245" coded terminals of successively succeeding converter means of the first of said series directly connected to one of the "1" "1248" and the "5" "1245" coded terminals of the preceding converter means of the next of said series, the terminals of the first preceding converter means of each of said series in increasing order being connected to said binary coded decimal terminals.

4. In a binary to binary coded decimal converter system, a plurality of binary terminals of successively increasing order, a plurality of "1248" coded groups of binary coded decimal terminals in successively increasing order, a plurality of "1248–1245" coded converter converter means each having "1," "2," "4," "8," "1248" coded terminals and "1," "2," "4," "5," "1245" coded terminals interconnected by "1248–1245" coding circuit means, said converter being connected in a plurality of stepped series with the "2," "4," "8," "1248" coded terminals of a preceding converter means of each of said series directly connected respectively to the "1," "2," "4," "1245" coded terminals of a succeeding converter means of that same series, with the "1" "1248" terminals of successively succeeding converter means of the first of asid series connected to binary terminals of successively increasing order, and with the "5" "'1245" coded terminals of successively succeeding converter means of the first of said series directly connected to the "1" "1248" coded terminals of the preceding converter means of the next of said series, the "1," "2," "4," "1245" coded terminals of the first preceding converter means of each said series in ascending succession being connected respectively to the "2," "4," "8," "1248" binary coded decimal terminals of groups of ascending order.

5. In a binary to binary coded decimal converter system, a plurality of binary terminals of successively increasing order, a plurality of "1248" coded groups of binary coded decimal terminals in successively increasing order, a plurality of "1248–1245" coded converter means each having "1," "2," "4," "8," "1248" coded terminals and "1," "2," "4," "5," "1245" coded terminals interconnected by "1248–1245" coding circuit means, said converter means being connected in a plurality of stepped series with the "2," "4," "8," "1248" coded terminals of a preceding converter means of each of said series directly connected respectively ot the "1," "2," "4," "1245" coded terminals of a succeeding converter means of that same series, with the "1" "1248" terminals of successively succeeding converter means of the first of said series connected to binary terminals of successively increasing order, and with the "5" "1245" coded terminals of successively succeeding converter means of the first of said series directly connected to the "1" "1248" coded terminals of the preceding converter means of the next of said series, the "1," "2," "4," "1245" coded terminals of the first preceding converter means of each said series in ascending succession being connected respectively to the "2," "4," "8," "1248" binary coded decimal terminals of groups of ascending order, with the "1" "1248 coded binary coded decimal terminal of the lowest order group being connected to the lowest order binary terminal, and with the "5" "1245" coded terminals of the first converter means of each of said series being connected to the "1" "1248" coded binary coded decimal terminals of successively higher order groups thereof.

6. In a binary to binary coded decimal converter system, a plurality of binary terminals of successively increasing order, a plurality of "1248" coded groups of binary coded decimal terminals in successively increasing order, a plurality of "1248–1245" coded converter means each having "1," "2," "4," "8," "1248" coded terminals and "1," "2," "4," "5," "1245" coded terminals interconnected by "1248–1245" coding circuit means, said converter means being connected in a plurality of stepped series with the "2," "4," "8," "1248" coded terminals of a succeeding converter means of each of said series directly connected respectively to the "1," "2," "4," "1245" coded terminals of a preceding converter means of that same series, with the "5" "1245" terminals of successively succeeding converter means of the first of said series connected to binary terminals of successively increasing order, and with "1" "1248" coded terminals of successively succeeding converter means of the first of said series directly connected to the "5" "1245" coded terminals of the preceding converter means of the next of said series, the "1," "2," "4," "8," '1248" coded terminals of the first preceding converter means of each said series in ascending succession being connected respectively to the "1," "2," "4," "8," "1248" binary coded decimal terminals of groups of ascending order.

7. In a binary to binary coded decimal converter system, a plurality of binary terminals of successively increasing order, a plurality of "1248" coded groups of binary coded decimal terminals in successively increasing order, a plurality of "1248–1245" coded converter means each having "1," "2," "4," "8," "1248" coded terminals and "1," "2," "4," "5," "1245" coded terminals interconnected by "1248–1245" coding circuit means, said converter means being connected in a plurality of stepped series with the '2," "4," "8," "1248" coded terminals of a succeeding converter means of each of said series directly connected respectively to the "1," "2," "4," "1245" coded terminals of a preceding converter means of that same series, with the "5" "1245" terminals of successively succeeding converter means of the first of said series connected to binary terminals of successively increasing order, and with the "1" "1248" coded terminals of successively succeeding converter means of the first of said series directly connected to the "5" "1245" coded terminals of the preceding converter means of the next of said series, the "1," "2," "4," "8," "1248" coded terminals of the first preceding converter means of each said series in ascending succession being connected respectively to the "1," "2," "4," "8," "1248" binary coded decimal terminals of groups of ascending order, with the "5" "1245" coded terminal of the first converter means of the first of said series being connected to the lowest order binary terminal.

References Cited

UNITED STATES PATENTS

| | | | |
|---|---|---|---|
| 2,860,327 | 11/1958 | Campbell | 340—347 |
| 3,026,034 | 3/1962 | Couleur | 235—155 |
| 3,082,950 | 3/1963 | Hogan | 235—155 |
| 2,981,471 | 4/1961 | Eachus | 235—169 X |

MAYNARD R. WILBUR, *Primary Examiner.*

MICHAEL K. WOLENSKY, *Assistant Examiner.*

U.S. Cl. X.R.

307—203; 328—46; 340—347